(12) United States Patent
Bhutani et al.

(10) Patent No.: US 8,102,647 B2
(45) Date of Patent: Jan. 24, 2012

(54) SYSTEM AND METHOD FOR INFORMATION HANDLING SYSTEM KEYBOARD STOWAGE

(75) Inventors: Gurmeet S. Bhutani, Punjab (IN); Ronald LeBert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 12/686,431

(22) Filed: Jan. 13, 2010

(65) Prior Publication Data

US 2011/0170250 A1  Jul. 14, 2011

(51) Int. Cl.
G06F 1/16 (2006.01)
H05K 5/00 (2006.01)
H05K 7/00 (2006.01)

(52) U.S. Cl. .................................................. 361/679.11
(58) Field of Classification Search ....... 361/679.08–679.17; 455/575.1–575.4, 455/575.8
See application file for complete search history.

(56) References Cited

U.S. PATENT DOCUMENTS

| | | | |
|---|---|---|---|
| 4,954,823 A | 9/1990 | Binstead | |
| 5,532,904 A * | 7/1996 | Sellers | 361/679.13 |
| 5,635,928 A * | 6/1997 | Takagi et al. | 341/22 |
| 5,694,124 A * | 12/1997 | Wood | 341/22 |
| 5,768,093 A * | 6/1998 | Howell et al. | 361/679.13 |
| 5,774,384 A * | 6/1998 | Okaya et al. | 345/169 |
| 5,812,116 A | 9/1998 | Malhi | |
| 6,087,966 A * | 7/2000 | Sato | 341/22 |
| 6,091,600 A * | 7/2000 | Jeong | 361/679.12 |
| 6,094,191 A * | 7/2000 | Watanabe et al. | 345/168 |
| 6,174,097 B1 | 1/2001 | Daniel | |
| 6,314,274 B1 * | 11/2001 | Kumagai | 455/90.3 |
| 6,529,370 B1 * | 3/2003 | Kamishima | 361/679.08 |
| 6,575,647 B1 | 6/2003 | Daniel | |
| 6,590,565 B2 * | 7/2003 | Hosoya | 345/168 |
| 6,773,178 B2 * | 8/2004 | Miyako et al. | 400/472 |
| 7,221,561 B2 * | 5/2007 | Pan et al. | 361/679.08 |
| 7,395,100 B2 * | 7/2008 | Cha et al. | 455/575.1 |
| 2006/0120029 A1 * | 6/2006 | Ryu et al. | 361/680 |
| 2007/0133156 A1 * | 6/2007 | Ligtenberg et al. | 361/681 |
| 2010/0091442 A1 * | 4/2010 | Theobald et al. | 361/679.09 |
| 2010/0239345 A1 * | 9/2010 | Sip | 400/477 |

* cited by examiner

Primary Examiner — Jinhee Lee
Assistant Examiner — Adrian S Wilson
(74) Attorney, Agent, or Firm — Hamilton & Terrile, LLP; Robert W. Holland

(57) ABSTRACT

A portable information handling system's integrated keyboard stows keys into a retracted position when the portable information handling system transitions from an open to a closed position, such as by rotating a lid to a closed position relative to a chassis having the keyboard. A cover plate disposed in the keyboard engages the keyboard keys to retract the keys into the information handling system when the lid of the information handling system rotates to a closed position and releases the keys to be biased out from the information handling systems when the lid rotates to an open position.

12 Claims, 2 Drawing Sheets

SYSTEM AND METHOD FOR INFORMATION HANDLING SYSTEM KEYBOARD STOWAGE

BACKGROUND OF THE INVENTION

1. Field of the Invention

The present invention relates in general to the field of information handling system integrated keyboards, and more particularly to a system and method for information handling system keyboard stowage.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processing components used to build information handling systems have increased in processing capabilities and decreased in size, manufacturers have sought to build portable information handling systems in housings having a reduced footprint. In particular, consumers have sought portable information handling systems that have reduced weight and height. A portable information handling system typically integrates all of the input/output devices that an end user uses to interact with the system, such as an integrated liquid crystal display (LCD) to present information and a keyboard to input information. In addition, portable information handling systems typically integrate a power source, such as a battery, and wireless network interface, such as an IEEE 802.11(g) interface, so that the end user can use the system free of any wired interfaces, such as an external power supply and Ethernet cable. Portable information handling systems that have reduced weight are generally easier and less awkward for end users to use and therefore provide an end user with improved mobility.

Two significant restrictions on reducing the size of an information handling system housing are the inclusion of a display that provides adequate viewing and the inclusion of a keyboard that an end user may comfortably type on. Conventional portable information handling system housings have a clamshell configuration in which a lid having an integrated display rotationally couples to a chassis that contains processing components, such as the CPU, RAM, and hard disk or solid state drive. The height of the lid and width of the chassis of such a conventional system typically is set by the size of the display selected for the system. The vertical height of the chassis depends upon the size and power of the components within the chassis, with more powerful components typically requiring greater vertical height, often so that adequate cooling airflow is available for the processing components. In addition, the vertical height of the chassis typically has to include adequate space to integrate a keyboard. A typical keyboard has keyboard caps that travel approximately 2.5 mm. Keyboard travel provides an end user with tactile feeling so that the user has some feedback when an input is made. One way to reduce chassis height is to reduce keyboard height by having reduced tactile feeling feedback, such as 2 mm, however, reducing key movement tends to make keyboards less user friendly. In some instances, keyboards are presented on touch screens that have no actual key movement. End users have difficulty using keyboards with little or no key movement because the lack of feedback makes it difficult for the end user to know when an input is made or to avoid repeated inputs by accidentally placing weight on a key.

SUMMARY OF THE INVENTION

Therefore a need has arisen for a system and method which reduces keyboard height with minimal impact on movement of keys of the keyboard.

In accordance with the present invention, a system and method are provided which substantially reduce the disadvantages and problems associated with previous methods and systems for integrating a keyboard into an information handling system. Keys extending from a keyboard of an information handling system retract to within the keyboard when the information handling system is transitioned to a closed position, such as when a lid closes over the keyboard. The keyboard keys extend when the information handling system transitions to an open position for normal interaction with an end user.

More specifically, an information handling system processes information with processing components disposed in a housing, such as a CPU and memory disposed in a housing chassis and a display disposed in a housing lid rotationally coupled to the chassis to move between open and closed positions. Moving the lid to the open position exposes the display in the lid and a keyboard in the chassis for normal use by an end user. In order to reduce the height of the chassis, keys of the keyboard retract to within the keyboard when the lid rotates to a closed position adjacent to the keyboard. A pressure plate within the keyboard is actuate by movement of the lid relative to the chassis so that movement of the lid is translated to the keys through engagement of the pressure plate with the keys. The pressure plate moves vertically between a cover plate that has openings for the keys and a keyboard plate that supports the keyboard in the information handling system so that engagement of the keys with the pressure plate retracts the keys to within the cover plate openings with the information handling system in the closed position and extends the keys from the cover plate openings with the information handling system in the open position.

The present invention provides a number of important technical advantages. One example of an important technical advantage is that keyboard height is reduced with minimal impact on movement of keys of the keyboard during end user inputs. In an open configuration, the keyboard keys are released to provide an end user with normal feedback movement. In a closed configuration, the keys retract into the chassis so that the amount of room between the lid and keyboard is minimized providing a reduced system height. Key retraction and extension occurs automatically so as to be indistinguishable by an end user, who uses the system as though a conventional keyboard is installed.

BRIEF DESCRIPTION OF THE DRAWINGS

The present invention may be better understood, and its numerous objects, features and advantages made apparent to FIG. 1 depicts a side cutaway view of an information handling system having keys that move between exposed and retracted positions with a cam and follower actuator.

DETAILED DESCRIPTION

Retracting keys of a keyboard into an information handling system while in a closed position reduces the chassis vertical height by reserving less room for the keyboard in the closed position. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
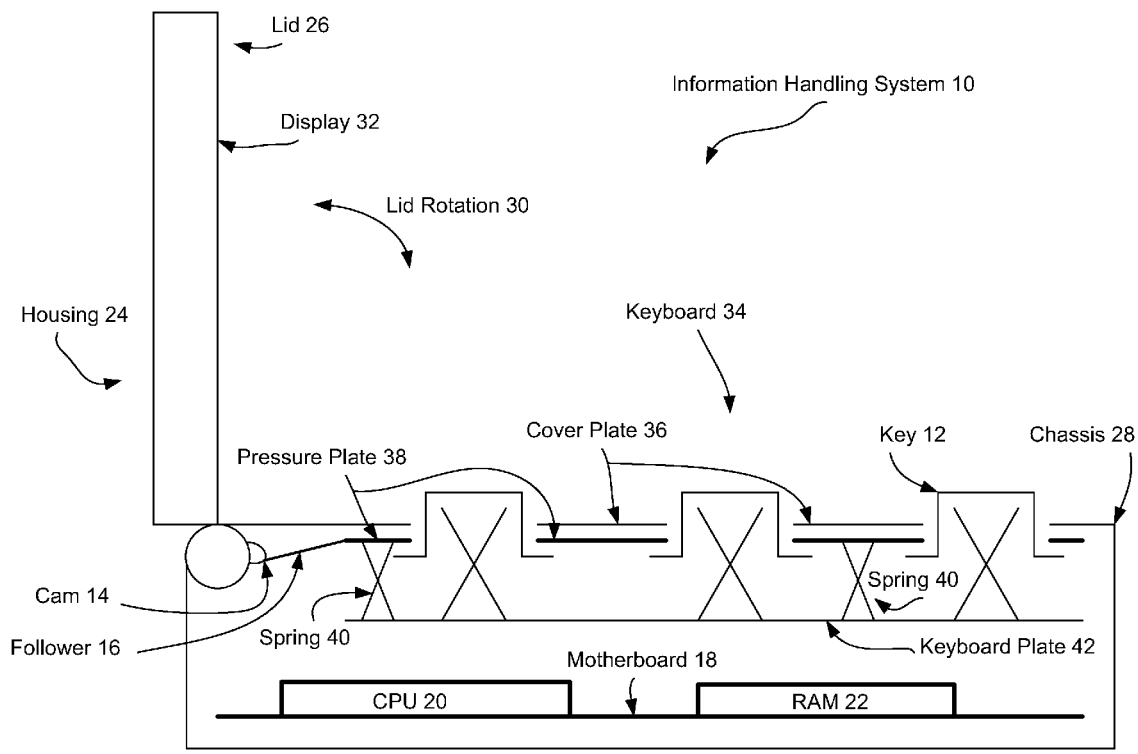

Referring now to FIG. 1, a side cutaway view depicts an information handling system 10 having keys 12 that move between exposed and retracted positions with a cam 14 and follower 16 actuator. Information handling system 10 is built with plural processing components, such as a motherboard 18, CPU 20 and RAM 22, disposed in a housing 24 having a lid 26 and chassis 28 in a clamshell configuration. Lid 26 rotates in the direction of lid rotation arrow 30 between an open position as depicted in which a display 32 and keyboard 34 are exposed for interaction with a user and a closed position in which lid 26 brings display 32 over top of keyboard 34 to provide a compact configuration for storage of information handling system 10. In order to reduce the overall height of chassis 28, keys 12 of keyboard 34 retract into chassis 28 before rotation of lid 26 brings display 32 into contact with keys 12, thus allowing lid 26 to use the distance that keys 12 normally extend over top of a cover plate 36 to have a reduced height in the stored configuration. When housing 24 is configured in an open position by rotating lid 26 away from keyboard 34, keys 12 extend to a normal height for use by an end user.

In operation, the movement of keys 12 between an extended position and a retracted position is managed by interaction between an actuator, such as a linkage provided by cam 14 and follower 16, and a pressure plate 38. Pressure plate 38 is biased upwards towards cover plate 36 by a biasing mechanism, such as springs 40. Pressure plate 38 engages with keys 12 so that a downward movement of pressure plate 38 will retract keys 12 relative to cover plate 36 and thereby provide additional room for closing lid 26 over top of keyboard 34. Keys 12 are retracted within chassis 28 against a keyboard plate 42 that provides structural support for keyboard 34 within chassis 28. In the example embodiment depicted by FIG. 1, the actuator and linkage that moves pressure plate 38 in response to an open or closed lid position is cam 14 associated with lid 26 and follower 16 associated with chassis 28. As lid 26 rotates along lid rotation 30, motion of lid 26 is translated through cam 14 to follower 16 to position pressure plate 38 as desired. For instance, cam 14 engages follower 16 with pressure plate 38 over the last ten degrees of rotational motion of lid 26 to move keys 12 downward from cover plate 36 just before lid 26 approaches keyboard 34. Rotation of lid 26 from the closed position towards the open position translates through cam 14 so that pressure plate 38 releases keys 12 from the retracted position to extend over top of cover plate 36 through the first ten degrees of rotational motion of lid 26. In alternative embodiments, the relationship between the position of lid 26 and keys 12 may be altered as appropriate and the amount of retraction of keys 12 may be set as desired to achieve a desired height of chassis 28. For example, keys 12 extend to an extended position 2 mm above cover plate 36 when lid 26 is in the open position and retract to a retracted position at or below the level of cover plate 36 when lid 26 rotates to the closed position. In one alternative embodiment, cam 14 and follower 16 are accessible to an end user for a manual input that retracts or extends keys 12, such with a linkage that extends to the exterior of chassis 28 to allow user interaction with pressure plate 38 by manual activation of cam 14 or follower 16.

Figure 2:
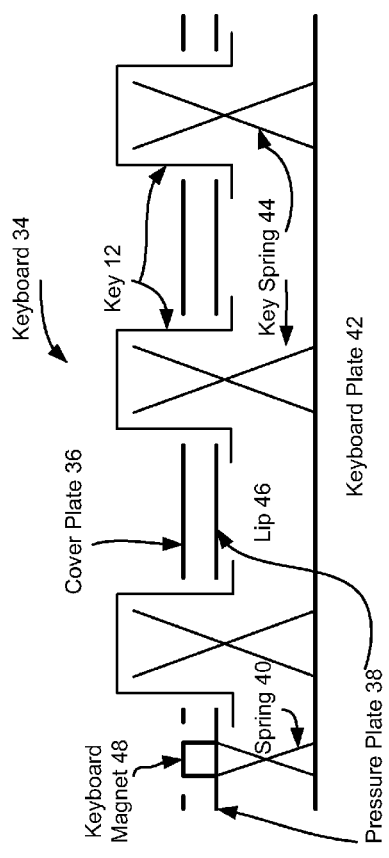
FIG. 2 depicts a side cutaway view of a keyboard having keys biased into an exposed position.

Referring now to FIG. 2, a side cutaway view depicts a keyboard 34 having keys 12 biased into an exposed position. The exposed position provides an extension of keys 12 over top of cover plate 36 for normal keyboard inputs, such as 2 to 2.5 mm of key extension above cover plate 36. Key springs 44 bias keys 12 upward to the extended position. A key lip 46 engages pressure plate 38 which, in turn, is supported against cover plate 36 to limit the upward movement of keys 12. A keyboard magnet 48 integrates with pressure plate 38 to provide an actuator for downward movement of pressure plate 38 when an opposing pole of a magnet disposed in a lid approaches. Keyboard plate 42 provides a rigid structure or cage to install keyboard 34 into an information handling system and to manage the various forces involved in adjusting the height of keys 12 relative to cover plate 36. Pressure plate springs 40 interact with keyboard plate 42 and pressure plate 38 to bias keys 12 upward in an extended position above cover plate 36 as depicted by FIG. 2.

Figure 3:
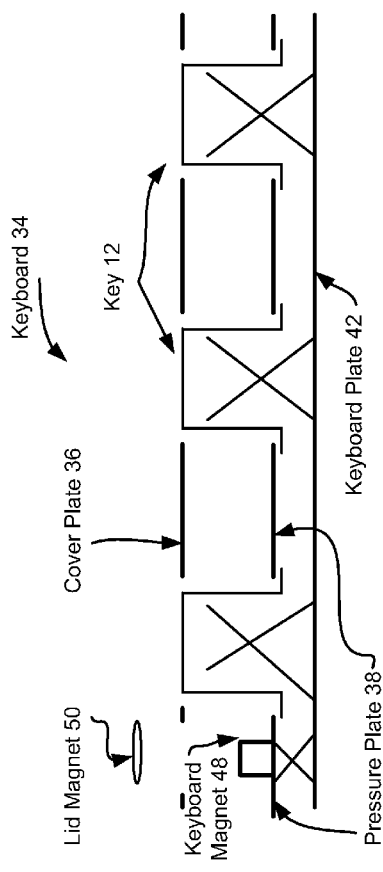
FIG. 3 depicts a side cutaway view of a keyboard having keys moved by a pressure plate and magnet actuator to a retracted position.

Referring now to FIG. 3, a side cutaway view depicts a keyboard 34 having keys 12 moved by a pressure plate 38 and magnet actuator to a retracted position. A lid magnet 50 aligns an opposing magnetic pole with keyboard magnet 48 as a lid closes over top of keyboard 34. The aligned opposing poles force keyboard magnet 48 away from lid magnet 50 thereby pushing pressure plate 38 away from cover plate 36. Pressure plate 38 engages the lip 46 of each key 12 to force each key 12 to retract towards keyboard plate 42. In the example embodiment of FIG. 3, the retracted position of keys 12 aligns the upper surface of keys 12 with the upper surface of cover plate 36 so that a lid can close over top of cover plate 36 without impacting keys 12. In alternative embodiments, keys 12 retract towards cover plate 36 in varying amounts as desired to provide room to close a lid over cover plate 36 as desired. When the downward force provided by the interaction of keyboard magnet 48 and lid magnet 50 is removed, pressure plate 38 biases upwards towards cover plate 36 with a biasing force applied by spring 40 to return the keys 12 to the extended position. In alternative embodiments, magnets may be arranged in varying ways to provide a desired position of pressure plate 38. For example, a magnet may be disposed on keyboard plate 42 to attract or repel pressure plate 38 as appropriate. In one alternative embodiment, a magnet on keyboard plate 42 interacts with manual switch at the exterior of keyboard 34 so that a user can selectively move the keys between the extended and retracted positions.

Although the present invention has been described in detail, it should be understood that various changes, substitutions and alterations can be made hereto without departing from the spirit and scope of the invention as defined by the appended claims.

What is claimed is:

1. An information handling system comprising:
    a housing having a chassis and a lid rotationally couple to the chassis, the lid operable to rotate between open and closed positions;
    plural processing components disposed in the chassis, the processing components operable to process information;
    a keyboard having plural keys, the keyboard supported in the chassis by a keyboard plate;
    a cover plate having openings for the keys, the cover plate disposed over and a fixed distance above the keyboard plate;
    a pressure plate disposed between the cover plate and the keyboard plate, the pressure plate operable to engage the keys to move the keys between an exposed position in which the keys protrude through the cover plate openings and a retracted position in which the keys retract towards the keyboard plate; and
    a pressure plate magnet coupled to the pressure plate and aligned to move the pressure plate to the retracted position as the lid rotates to the closed position.

2. The information handling system of claim 1 further comprising a lid magnet disposed in the lid, the pressure plate magnet and lid magnet having opposing poles aligned to move the pressure plate to the refracted position as the lid rotates to the closed position.

3. The information handling system of claim 1 wherein the retracted position comprises the keys position below the cover plate openings.

4. The information handling system of claim 1 wherein the distance of key travel between the retracted and exposed positions comprises approximately 2 mm.

5. The information handling system of claim 1 further comprising a biasing mechanism disposed between the keyboard plate and the pressure plate, the biasing mechanism operable to bias the keys to the exposed position.

6. A method for selectively stowing a keyboard integrated in an information handling system, the method comprising:
    rotating a lid of the information handling system from an open position towards a closed position; and
    translating the rotating of the lid to retract keys of a keyboard from an exposed position protruding through openings of a cover plate to a retracted position in which a distance that the keys protrude through the openings is reduced relative to the exposed position, the translating comprising bringing a first pole of a lid magnet in alignment with an opposing pole of a pressure plate magnet, the opposing poles pushing the pressure plate away from the lid.

7. The method of claim 6 wherein the retracted position comprises the keys retracted to not protrude through the openings of the cover plate.

8. The method of claim 6 further comprising:
    rotating a lid of the information handling system from the closed position towards the open position; and
    translating the rotating of the lid to extend keys of the keyboard from the retracted position to the extended position in which keys protrude through the cover plate openings.

9. The method of claim 6 wherein translating the rotating of the lid to extend keys further comprises biasing the keys to extend with springs operating against the pressure plate.

10. A system for selectively stowing a keyboard integrated in an information handling system, the keyboard having plural keys, the system comprising:
    a pressure plate integrated in the keyboard below a cover plate of the keyboard, the cover plate having openings, the keys extending through the openings, the pressure plate operable to engage the keys; and
    an actuator coupled to the pressure plate, the actuator operable to move the pressure plate to retract the keys of the keyboard in towards the cover plate openings in response to a predetermined condition;
    wherein the actuator comprises first and second magnets having opposing poles and aligned to come within a predetermined proximity at the predetermined condition.

11. The system of claim 10 wherein the predetermined condition comprises transitioning an information handling system from an open position to a closed position.

12. The system of claim 10 further comprising a biasing mechanism to bias the pressure plate to extend the keys when the predetermined condition is not present.

\* \* \* \* \*